US012384157B2

(12) United States Patent
Lee

(10) Patent No.: US 12,384,157 B2
(45) Date of Patent: Aug. 12, 2025

(54) INK SUPPLY SYSTEM FOR INK-JET HEAD WITH STEAM CLEANING FUNCTION AND INK-JET PRINTER HAVING SAME

(71) Applicant: GOSANTECH CO., LTD., Cheonan-si (KR)

(72) Inventor: Jinyoung Lee, Cheonan-si (KR)

(73) Assignee: GOSANTECH CO., LTD., Cheonan-si (KR)

( * ) Notice: Subject to any disclaimer, the term of this patent is extended or adjusted under 35 U.S.C. 154(b) by 224 days.

(21) Appl. No.: 18/296,621

(22) Filed: Apr. 6, 2023

(65) Prior Publication Data

US 2024/0083171 A1 Mar. 14, 2024

(30) Foreign Application Priority Data

Sep. 8, 2022 (KR) ........................ 10-2022-0114003

(51) Int. Cl.
*B41J 2/165* (2006.01)
*B41J 2/185* (2006.01)

(52) U.S. Cl.
CPC ......... *B41J 2/16552* (2013.01); *B41J 2/1652* (2013.01); *B41J 2/185* (2013.01); *B41J 2002/16555* (2013.01); *B41J 2002/16564* (2013.01)

(58) Field of Classification Search
CPC .................... B41J 2/16552; B41J 2/185; B41J 2002/16555; B41J 2/175
USPC ........................................................... 347/22
See application file for complete search history.

(56) References Cited

U.S. PATENT DOCUMENTS

2006/0274110 A1 12/2006 Kang et al.

FOREIGN PATENT DOCUMENTS

| | | | | |
|---|---|---|---|---|
| JP | 2005238541 | A | * | 9/2005 |
| JP | 2008-6657 | A | | 1/2008 |
| KR | 100431007 | B1 | * | 4/2004 |
| KR | 10-2021-0070281 | A | | 6/2021 |
| KR | 10-2022-0094897 | A | | 7/2022 |

* cited by examiner

*Primary Examiner* — Sharon Polk
(74) *Attorney, Agent, or Firm* — Sughrue Mion, PLLC

(57) ABSTRACT

Disclosure is an ink supply system for an ink-jet head with a steam cleaning function. The ink supply system includes an ink-jet head including a nozzle, an ink storing device, a gas pressure control system applying negative or positive pressure to the ink storing device, a cleansing solution storing part, and a steam generating device changing at least a part of the cleansing solution into steam, wherein the cleansing solution or the cleansing solution steam is inserted into the ink storing device to clean the ink storing device and the ink-jet head.
The ink supply system cleans quickly and completely residue of ink to prevent contamination during the process of changing and using ink, and the ink storage, the ink-jet head, and the ink flow path are cleaned by evaporated cleansing solution during long-term printing, thereby maintaining the ink-jet head and the ink supply system into the initial state.

8 Claims, 4 Drawing Sheets

INK SUPPLY SYSTEM FOR INK-JET HEAD WITH STEAM CLEANING FUNCTION AND INK-JET PRINTER HAVING SAME

CROSS REFERENCE TO RELATED APPLICATION

The present application claims priority to Korean Patent Application No. 10-2022-0114003 Sep. 8, 2022, the entire contents of which is incorporated herein for all purposes by this reference.

BACKGROUND OF THE INVENTION

Field of the Invention

The present disclosure relates to an ink supply system for an ink-jet head. More particularly, the present disclosure relates to an ink supply system for an ink-jet head in an industrial ink-jet printer in which an ink storing device and the ink-jet head are separated from each other.

Description of the Related Art

Currently, devices for ejecting liquid are used in industrial fields for various purposes. For example, for the purpose of printing a specific shape such as an electric circuit, liquid is ejected to a desired location to form a pattern, in order to manufacture thin fibers, liquid may be ejected thinly, and in order to coat a surface, liquid may be ejected onto the surface of an object to be coated.

An inkjet method ejecting liquid ink in the form of droplets on a surface of a medium according to a shape signal has been used as not only printing to create documents or flyers, but also a solution process in semiconductor or display field.

The application range of inkjet printing, which can form complex patterns on a substrate or precisely eject ink only at a specific location, is expanding. A small ink-jet printer for document creation has a form of storing ink in an ink-jet head that ejects ink droplets. However, an ink-jet printer manufactured for large-scale document preparation or industrial use uses a large amount of ink, so a structure in which an ink storage and an ink-jet head are separated is applied thereto.

Furthermore, in order to eject ink by a precise amount in the ink-jet printing process, ink in preparation for ejection in in the ink-jet head should maintain the meniscus state, in which the ink is formed in a curved surface state that is concave inward by capillary action based on a nozzle inlet. To this end, a location of the ink storing device for supplying ink to the ink-jet head is located higher than a location of the ink-jet head, and the ink storage device for head supply is located higher than the inkjet head, and instead, the inside of the ink storage for supplying ink to the ink-jet head is maintained in a vacuum to generate negative pressure in the ink storage device for head supply to prevent ink from flowing down in the ink-jet head, so it is necessary to maintain the meniscus state.

The industrial ink-jet printing device has been developed into a form suitable for mass production while maintaining a basic characteristic of ink-jet printing, which is precision, and the development has been made by providing an ink storing device for supplying ink to a head with a large capacity or constantly supplying ink to the ink storing device for supplying a head. However, recently, as the industrial atmosphere of small-item mass production has changed to the industrial atmosphere of multi-product small-lot production, new requirements are required for the industrial ink-jet printer. In the past, the main purpose was to perform a single process repeatedly for a long time using one type of ink in one industrial ink-jet printer, but recently, by using one industrial ink-jet printer, there is also an increasing a requirement for configuration that can perform various processes while changing various types of ink. Currently, in order to change ink used in the industrial ink-jet printer, after all ink used is removed and then the ink storing device for supplying ink to a head, an ink-jet head, and a path are completely cleaned so as to prevent a problem generated due to ink used previously, so it is currently not practical to perform work using various types of ink in one ink-jet printer. Furthermore, in mass production of products using ink-jet printing, in order to improve product reliability during long-team use, the ink supply unit and the ink-jet head must be maintained in their initial state, and various attempts have been made for this purpose.

Therefore, requirement for the industrial ink-jet printer that may be used while maintaining the characteristics of the ink-jet printing is increasing.

DOCUMENTS OF RELATED ART

Korean Patent Application Publication No. 10-2021-0070281

SUMMARY OF THE INVENTION

Accordingly, the present disclosure has been made keeping in mind the above problems occurring in the prior art, and an objective of the present disclosure is intended to provide an ink supply system for an ink-jet head and an ink-jet printer having the same, the ink supply system being capable of preventing contamination of new ink, of reducing the time required to change ink, and of maintaining the ink-jet head and the ink supply system in initial states thereof in pertaining ink-jet printing for a long time, by cleaning quickly and completely removing a residue of ink that was used previously in a process of changing a type of ink used.

In order to achieve the above objective, according to an aspect of the present disclosure, there is provided an ink supply system for an ink-jet head with a steam cleaning function, the ink supply system including: an ink-jet head including a nozzle ejecting ink; an ink storing device in which ink supplied to the ink-jet head may be stored; a gas pressure control system applying negative pressure or positive pressure to the ink storing device; a cleansing solution storing part configured to store a cleansing solution; and a steam generating device configured to change at least a part of the cleansing solution that is stored in the cleansing solution storing part into steam, wherein the cleansing solution stored in the cleansing solution storing part or the cleansing solution steam may be inserted into the ink storing device to clean the ink storing device and the ink-jet head.

The cleansing solution storing part may be a buffer storing part that may be provided for supplying ink to the ink storing device.

The ink supply system may include: a buffer storing part for supplying ink to the ink storing device, wherein the cleansing solution storing part may be connected to the buffer storing part.

The cleansing solution storing part may be connected to the gas pressure control system, thereby enabling the cleansing solution or the cleansing solution steam to be transferred to the ink storing device by the positive pressure generated from the gas pressure control system.

The ink supply system may include: an ink recovery part located at a lower portion of the ink-jet head and configured to collect the ink ejected from the ink-jet head, and a reuse flow path configured to return the ink collected in the ink recovery part to the ink storing device.

According to another aspect of the present disclosure, there is provided an ink-jet printer having an ink supply system for an ink-jet head with a steam cleaning function, the ink-jet printer including: an ink-jet head including a nozzle ejecting ink; an ink storing device in which ink supplied to the ink-jet head may be stored; a gas pressure control system applying negative pressure or positive pressure to the ink storing device; a cleansing solution storing part configured to store a cleansing solution; and a steam generating device configured to change at least a part of the cleansing solution that is stored in the cleansing solution storing part into steam, wherein the cleansing solution stored in the cleansing solution storing part or the cleansing solution steam may be inserted into the ink storing device to clean the ink storing device and the ink-jet head.

The cleansing solution storing part may be a buffer storing part that may be provided for supplying ink to the ink storing device.

The ink-jet printer may include a buffer storing part for supplying ink to the ink storing device, wherein the cleansing solution storing part may be connected to the buffer storing part.

The cleansing solution storing part may be connected to the gas pressure control system, thereby enabling the cleansing solution or the cleansing solution steam to be transferred to the ink storing device by the positive pressure generated from the gas pressure control system.

The ink-jet printer may include an ink recovery part located at a lower portion of the ink-jet head and configured to collect the ink ejected from the ink-jet head, and a reuse flow path configured to return the ink collected in the ink recovery part to the ink storing device.

According to the present disclosure that is configured as described above, the ink storage, the ink-jet head, and the path through which ink moves are cleaned by evaporating cleansing solution, so that there is the effect that a residue of ink used previously is quickly and completely cleaned to prevent contamination in a process in which ink is changed and used.

Furthermore, as cleaning is performed by using compartments that are provided in the ink supply system without separating compartments, there is the effect of significantly reducing the time required for the process of cleaning residue of ink used previously to significantly reduce the time required for the ink replacement process.

Moreover, even when the device is cleaned without changing ink with the ink recovery part, there is the effect of reusing ejected ink by quickly ejecting stored ink and then performing cleaning by steam.

Moreover, as the ink storage, the ink-jet head, and the path through which ink moves are cleaned by evaporating the cleansing solution in performing the ink-jet printing for a long time, there is the effect of maintaining the ink-jet head and the ink supply system in initial states thereof.

DETAILED DESCRIPTION OF THE INVENTION

Figure 1:
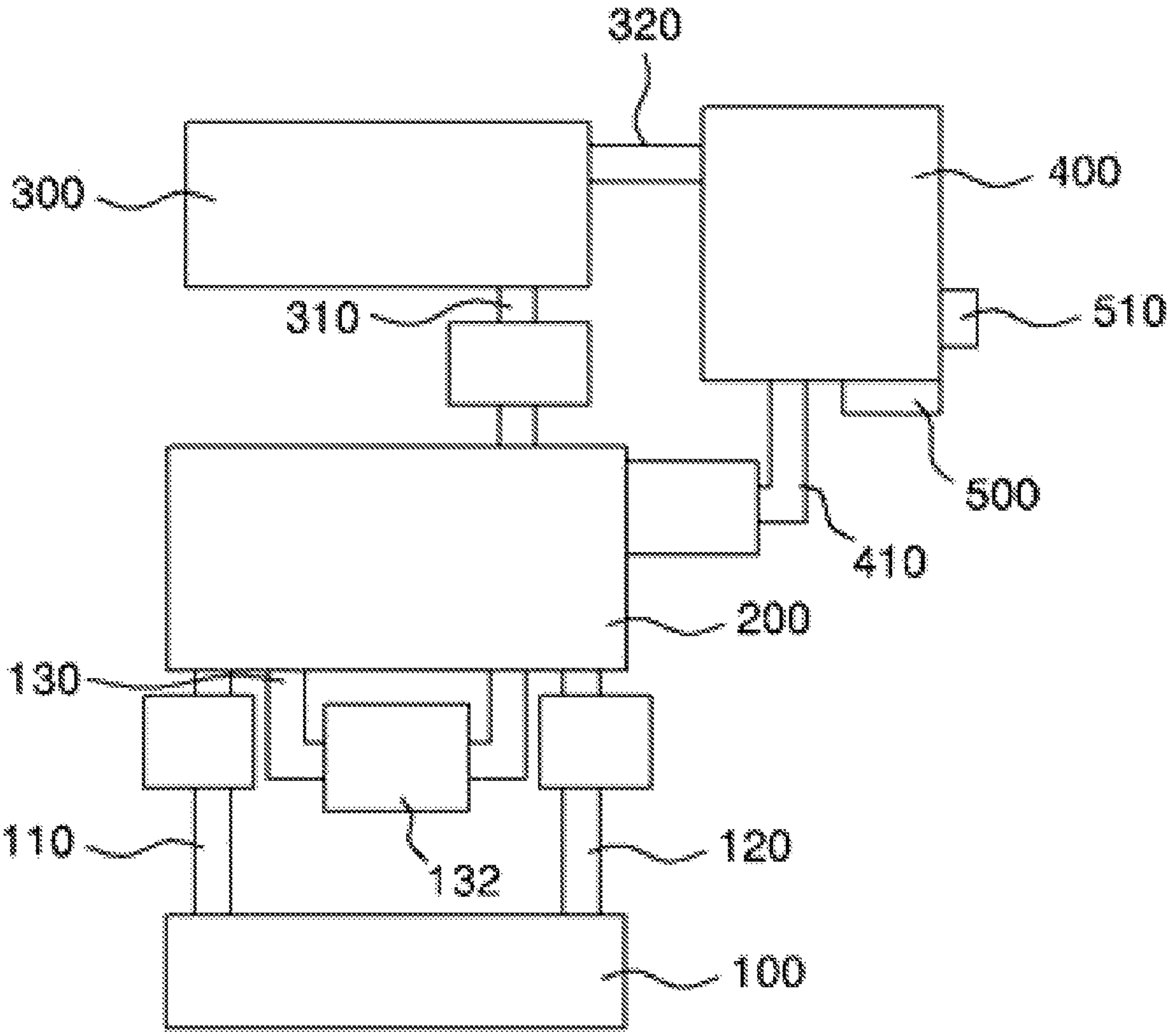
FIG. 1 is a mimetic diagram showing configuration of an ink supply system for an ink-jet head with a steam cleaning function according to a first embodiment.

Exemplary embodiments according to the present disclosure will be described in detail with reference to accompanying drawings.

However, various changes to the following embodiments are possible and the scope of the present disclosure is not limited to the following embodiments. In these drawings, the shapes and sizes of elements may be exaggerated for explicit description, and the same reference numerals are used throughout the different drawings to designate the same or similar components.

As used herein, it will be understood that when an element is referred to as being “coupled” or “connected” to another element, it can be directly coupled or connected to the other element or electrically coupled or connected thereto with intervening elements that may be present therebetween. Furthermore, unless the context clearly indicates otherwise, it will be further understood that that the teams “comprises”, “comprising”, “includes”, and/or “including”, when used herein, specify the presence of stated features, integers, steps, operations, elements, and/or components, but do not preclude the presence or addition of one or more other features, integers, steps, operations, elements, components, and/or groups thereof.

Terms such as a first term and a second term may be used for explaining various constitutive elements, but the constitutive elements should not be limited to these terms. These terms is used only for the purpose for distinguishing a constitutive element from other constitutive element. For example, a first constitutive element may be referred as a second constitutive element, and the second constitutive element may be also referred to as the first constitutive element. Hereinabove, the present disclosure has been described with reference to the preferred embodiments.

FIG. 1 is a mimetic diagram showing configuration of an ink supply system for an ink-jet head with a steam cleaning function according to a first embodiment.

According to the first embodiment of the present disclosure, the ink supply system for an ink-jet head with a steam cleaning function includes: an ink-jet head 100, an ink storing device 200, a gas pressure control system 300, a buffer storing part 400, and a steam generating device 500.

The ink-jet head 100 is a part having a nozzle ejecting ink. The ink-jet printer shown in the drawing is configured for industrial use, so that the ink-jet head 100 and the ink storing device 200 are provided to be separated from each other. The detailed configuration of the ink-jet head 100 may adopt all technical configuration of the ink-jet head used conventionally without departing from a range that does not harm the characteristics of the present disclosure. Specifically, in order to prevent the nozzle of the ink-jet head 100 from being blocked by fine bubbles, the present disclosure may include the configuration that is for ejecting the micro bubbles outside the ink-jet head 100.

The ink storing device 200 is a part that stores the ink to supply the ink to the ink-jet head 100. First ends of a supply flow path 110, which is for supplying the ink to the ink-jet head 100, and a recovery flow path 120, along which at least a part of the ink supplied to the ink-jet head 100 is circulated and returns, are connected to the ink storing device 200, and a first end of a pressure control tube 310 for maintaining the meniscus state is connected thereto.

Second ends of the supply flow path 110 and the recovery flow path 120 of which the first ends are connected to the ink storing device 200 are connected to the ink-jet head 100. The ink-jet head 100 is supplied with ink via the supply flow path 110 and performs ink-jet printing via the nozzle. As at least a part of the supplied ink is recovered to the ink storing device 200 via the recovery flow path 120, the ink is circulated. At this point, a circulation pump may be provided to achieve the circulation of ink via the supply flow path 110 and the recovery flow path 120. The circulation pump is mainly provided at the recovery flow path 120 and generally, serves to recover at least a part of the ink, which is supplied to the ink-jet head 100, to the ink storing device 200. However, a location of the circulation pump is not limited to the recovery flow path 120, and may be formed on the supply flow path. As the circulation pump constantly circulates ink between the ink storing device 200 and the ink-jet head 100, the dispersibility of the ink can be maintained, and at this point, it is preferable to prevent an operation of the circulation pump from affecting the meniscus state.

In addition to maintaining of constant flow of the ink by using the supply flow path 110 and the recovery flow path 120 that are connected to the ink-jet head 100, a circulation flow path 130 may be added to drain ink to the outside from the ink storing device 200 and return back the ink into the ink storing device 200. In the embodiment shown in the drawing, the circulation flow path 130 on which a pump 132 is provided is connected to the ink storing device 200, so that ink stored in the ink storing device 200 is prevented from being stored in a stationary state, and the ink maintains the flowability while constantly moving along the circulation flow path 130, thereby maintaining the dispersibility of the ink. Even in a process of forming a flow of ink via the circulation flow path 130, it is controlled to maintain the meniscus state of the ink.

A second end of the pressure control tube 310 is connected to the gas pressure control system 300, and the gas pressure control system 300 controls the pressure in the ink storing device 200, thereby applying negative pressure into the ink storing device 200 in order for the ink in the ink-jet head 100 to be maintained in the meniscus state. Eventually, except for specific cases, since the embodiment is configured to constantly suction air via the pressure control tube 310, while a bubble fainted at the ink storing device 200 bursts, a droplet of the ink spread upward may move via the pressure control tube 310. The droplet of the ink flowing into the pressure control tube 310 causes failure in the gas pressure control system 300, so that the configuration that prevents ink or a droplet of ink from being introduced into the pressure control tube 310 may be applied.

The buffer storing part 400 is connected to the ink storing device 200 via an additional supply tube 410, thereby being applied to inject ink into the ink storing device without harming the meniscus state. When ink is added into the buffer storing part 400, additional ink can be injected without considering the meniscus state. There is a loss when printing stops in a process of adding ink consumed by performing printing, but when ink is added via the buffer storing part 400, ink can be constantly added without stopping a printing process. For this buffer storing part 400, techniques used in a general ink-jet printer may be applied almost without limitation, but in the embodiment, it is characterized in that the buffer storing part 400 may also be used as a space for forming and supplying the cleansing solution steam.

The present disclosure is characterized in that the cleansing solution steam is used to clean the ink-jet head, the ink storing device, and the like, and in the embodiment, the buffer storing part 400 serves as the space that may be provided to store the cleansing solution for forming cleaning steam and to change the stored cleansing solution into the steam and supply the steam into the ink storing device and the like.

The function of storing the cleansing solution may be performed by ejecting the cleansing solution into the buffer storing part 400 that has been empty as all the ink stored in the buffer storing part 400 is inserted into the ink storing device 200. Accordingly, for storage of the cleansing solution, there is no need to change the configuration of the conventional buffer storing part 400.

In order to perform the function as the space in which cleansing solution steam is generated, the steam generating device 500 that heats or sprays the cleansing solution for generating steam may be coupled to the buffer storing part 400?, and the steam generating device 500 may be configured to be operated. When the steam generating device 500 generates the cleansing solution steam by a heating method, the steam generating device 500 should be configured to transfer heat generated by the steam generating device 500 to the stored cleansing solution. For example, the buffer storing part 400 may consist of a material with high thermal conductivity. When the steam generating device 500 generates the cleansing solution steam by a spray method, a spray generating structure such as a ultrasonic vibrator may be configured to be exposed to the inside of the buffer storing part 400.

For the function of supplying the cleansing solution steam into the ink storing device and the like, the steam generating device 500 should be connected to the ink storing device, and since the additional supply tube 410 for replenishing ink is connected to the ink storing device 200, the additional supply tube 41 may be used as a connection tube for supplying the cleansing solution steam. Furthermore, for the function of supplying the cleansing solution steam into the ink storing device, power transferring the cleansing solution steam is required, and as positive pressure is applied, the cleansing solution steam that is generated inside the buffer storing part 400 may be pushed and supplied into the ink storing device and the like. To this end, in the embodiment, a second pressure control tube 320 of the gas pressure control system 300 is connected to the buffer storing part 400. The cleansing solution steam that is generated in the buffer storing part 400 may be supplied to the ink storing device 200 and the like by using the positive pressure that is generated in the gas pressure control system 300.

Likewise, the buffer storing part 400 may be used as the cleansing solution storing part that is the space for generating the cleansing solution steam, but the present disclosure is not limited thereto. The cleansing solution storing part may be formed separately from the buffer storing part 400, or only the cleansing solution storing part may be additionally provided with the buffer storing part 400 not applied. However, as shown in the embodiment, as the configuration of the buffer storing part 400 is applied, and it is configured to generate the cleansing solution steam, when the buffer storing part 300 is configured to serve the function of the cleansing solution storing part at the same time, the buffer storing part 400 performs both of the function of the buffer storing part that facilitates the process of additionally ejecting ink and the function of generating the cleansing solution steam, so that the space efficiency of the device can be improved.

The steam generating device 500 is a device that heats or sprays the cleansing solution to generate the cleansing solution steam. The steam generating device 500 is provided at the buffer storing part 400 in which the cleansing solution is stored, and a heating plate for heating, the ultrasonic vibrator for spraying, or the like may be exposed to the inside of the buffer storing part 400. The embodiment corresponds to the case in which the cleansing solution steam is generated by the heating method, and in order to prevent excessive heat from being generated, a temperature sensor 510 may be provided together with the buffer storing part 400.

According to the first embodiment shown in FIG. 1, in the ink supply system for an ink-jet head with a steam cleaning function, a process of performing the steam cleaning will be described as follows.

First, when the steam cleaning is performed, additional ink supply stops, so that more ink is not replenished into the buffer storing part 400, and with the buffer storing part 400 entirely empty, the cleansing solution is supplied into the buffer storing part 400. The cleansing solution is not particularly limited and a variety of solutions that may clean the ink storing device, the ink-jet head, and the like of the ink-jet printer may be applied. For example, simple water may be used, and a cleansing solution to which a cleaning component is added may be used.

While the cleansing solution is supplied to the buffer storing part 400 and ink is removed from both of the ink storing device 200 and the ink-jet head 100, the cleansing solution steam is generated by using the cleansing solution supplied to the buffer storing part 400. At this point, the cleansing solution steam may be supplied to the ink storing device 200 together with generation of the cleansing solution steam, but it is preferable that the cleansing solution steam is generated when a large amount of the cleansing solution steam is supplied at once and the additional supply tube 410 is closed for performing the cleaning. Furthermore, in order to prevent the cleansing solution steam from flowing into the gas pressure control system 300, it is preferable that the cleansing solution steam is generated with the second pressure control tube 320 also closed.

After sufficient cleansing solution steam is generated from the buffer storing part 400, the gas pressure control system 300 applies positive pressure via the second pressure control tube 320 and opens the additional supply tube 410, so that the cleansing solution steam is supplied to the ink storing device 200 via the additional supply tube 410.

The cleansing solution steam is supplied to the ink storing device 200 via the additional supply tube 410 and then is supplied to the ink-jet head 100 via the supply flow path 110 and/or the recovery flow path 120, and moreover is supplied to the circulation flow path 130. At this point, in order to secure sufficient cleaning time for the ink storing device 200 and the circulation flow path 130, the supply flow path 110 and the recovery flow path 120 may be blocked for predetermined time so as to prevent the cleansing solution steam from moving and being ejected via the ink-jet head 100. Likewise, while the cleansing solution steam moves, the ink storing device 200 and the ink-jet head 100 and the supply flow path 110, the recovery flow path 120, and the circulation flow path 130 that are connected to the ink storing device 200 and the ink-jet head 100 are steam-cleaned.

After then, evaporation of the cleansing solution is stopped, and the cleansing solution is supplied in high pressure so that secondary cleaning can be performed. After the cleaning process using the cleansing solution steam and the cleansing solution is completed, dry air is injected from the gas pressure control system 300 thereby drying the inside portion.

The ink-jet printer having the ink supply system for an ink-jet head with a steam cleaning function, which has the above-described structure, generates the cleansing solution steam to clean the ink storing device and the ink-jet head, thereby making the ink storing device and the ink-jet head into a state in which concentrated, deposited or adhered ink and particles can be easily removed. After then, as the ink storing device and the ink-jet head can be cleaned thoroughly by performing cleaning with the high-pressure cleansing solution, when ink is changed, a problem of contamination of new ink does not occur, in addition, when the same ink is used, as a problem as cleaning is performed during using printing, a problem generated due to residue ink and the like can be prevented.

Figure 2:
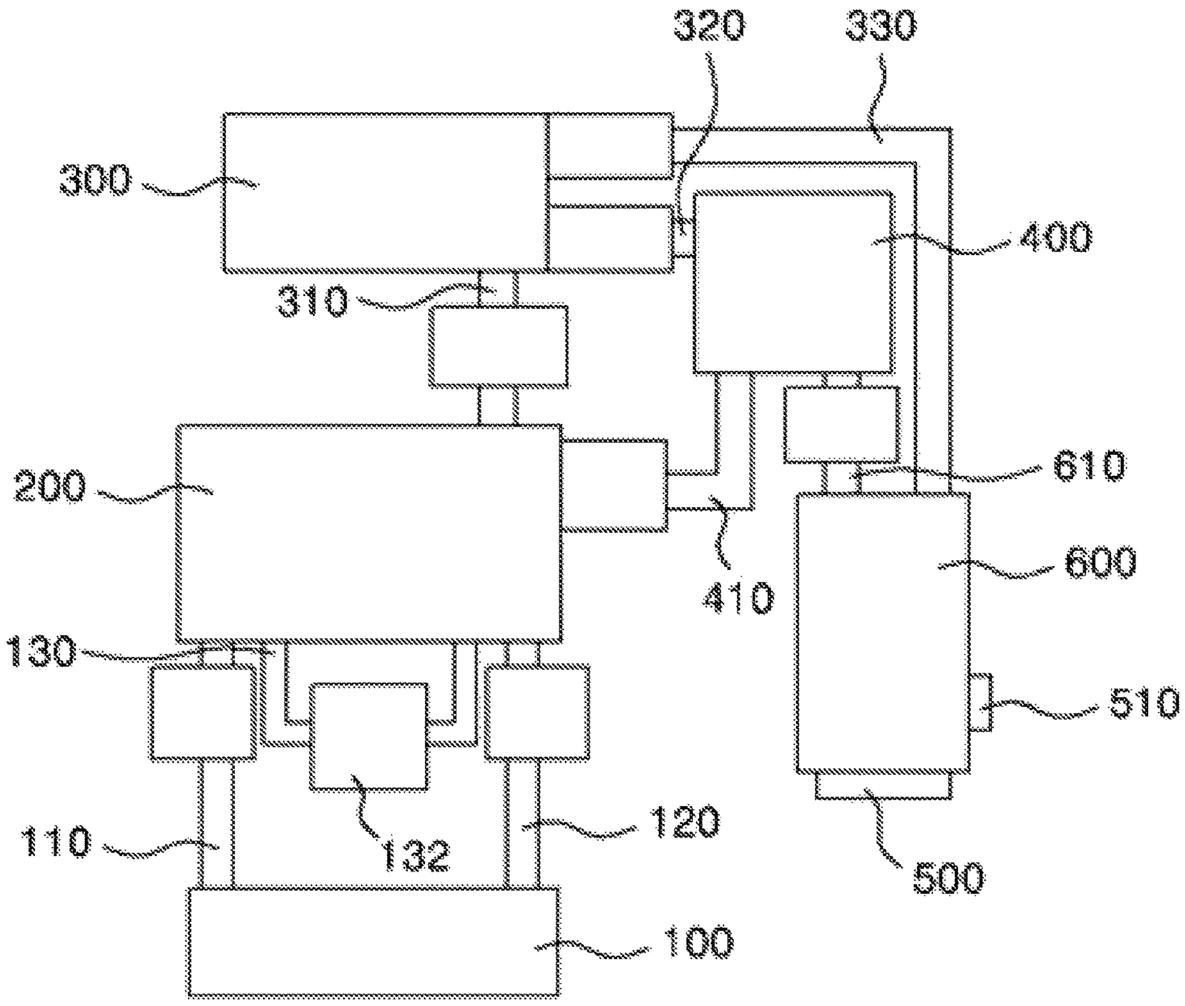
FIG. 2 is a mimetic diagram showing configuration of an ink supply system for an ink-jet head with a steam cleaning function according to a second embodiment.

FIG. 2 is a mimetic diagram showing configuration of an ink supply system for an ink-jet head with a steam cleaning function according to a second embodiment.

According to the second embodiment of the present disclosure, the ink supply system for an ink-jet head with a steam cleaning function includes: the ink-jet head 100, the ink storing device 200, the gas pressure control system 300, the buffer storing part 400, the steam generating device 500, and a cleansing solution storing part 600.

The ink-jet head 100 is a part having a nozzle ejecting ink. The ink-jet printer shown in the drawing is configured for industrial use, so that the ink-jet head 100 and the ink storing device 200 are provided to be separated from each other. The detailed configuration of the ink-jet head 100 may adopt all technical configuration of the ink-jet head used conventionally without departing from a range that does not harm the characteristics of the present disclosure. Specifically, in order to prevent the nozzle of the ink-jet head 100 from being blocked by fine bubbles, the present disclosure may include the configuration that is for ejecting the micro bubbles outside the ink-jet head 100.

The ink storing device 200 is a part that stores the ink to supply the ink to the ink-jet head 100. First ends of a supply flow path 110, which is for supplying the ink to the ink-jet head 100, and a recovery flow path 120, along which at least a part of the ink supplied to the ink-jet head 100 is circulated and returns, are connected to the ink storing device 200, and a first end of a pressure control tube 310 for maintaining the meniscus state is connected thereto.

Second ends of the supply flow path 110 and the recovery flow path 120 of which the first ends are connected to the ink storing device 200 are connected to the ink-jet head 100. The ink-jet head 100 is supplied with ink via the supply flow path 110 and performs ink-jet printing via the nozzle. As at least a part of the supplied ink is recovered to the ink storing device 200 via the recovery flow path 120, the ink is circulated. At this point, a circulation pump may be provided to achieve the circulation of ink via the supply flow path 110 and the recovery flow path 120. The circulation pump is mainly provided at the recovery flow path 120 and generally, serves to recover at least a part of the ink, which is supplied to the ink-jet head 100, to the ink storing device 200. However, a location of the circulation pump is not limited to the recovery flow path 120, and may be formed on the supply flow path. As the circulation pump constantly circulates ink between the ink storing device 200 and the ink-jet head 100, the dispersibility of the ink can be maintained, and at this point, it is preferable to prevent an operation of the circulation pump from affecting the meniscus state.

In addition to maintaining of constant flow of the ink by using the supply flow path 110 and the recovery flow path 120 that are connected to the ink-jet head 100, a circulation flow path 130 may be added to drain ink to the outside from the ink storing device 200 and return back the ink into the ink storing device 200. In the embodiment shown in the drawing, the circulation flow path 130 on which a pump 132 is provided is connected to the ink storing device 200, so that ink stored in the ink storing device 200 is prevented from being stored in a stationary state, and the ink maintains the flowability while constantly moving along the circulation flow path 130, thereby maintaining the dispersibility of the ink. Even in a process of forming a flow of ink via the circulation flow path 130, it is controlled to also maintain the meniscus state of the ink.

A second end of the pressure control tube 310 is connected to the gas pressure control system 300, and the gas pressure control system 300 controls the pressure in the ink storing device 200, thereby applying negative pressure into the ink storing device 200 in order for the ink in the ink-jet head 100 to be maintained in the meniscus state. Eventually, except for specific cases, since the embodiment is configured to constantly suction air via the pressure control tube 310, while a bubble famed at the ink storing device 200 bursts, a droplet of the ink spread upward may move via the pressure control tube 310. The droplet of the ink flowing into the pressure control tube 310 causes failure in the gas pressure control system 300, so that the configuration that prevents ink or a droplet of ink from being introduced into the pressure control tube 310 may be applied.

The buffer storing part 400 is connected to the ink storing device 200 via an additional supply tube 410, thereby being applied to inject ink into the ink storing device without harming the meniscus state. When ink is added into the buffer storing part 400, additional ink can be injected without considering the meniscus state. There is a loss when printing stops in a process of adding ink consumed by pertaining printing, but when ink is added via the buffer storing part 400, ink can be constantly added without stopping a printing process. For this buffer storing part 400, techniques used in the general ink-jet printer may be applied almost without limitation.

The cleansing solution storing part 600 is connected to the buffer storing part 400 and is configured to store the cleansing solution and generate the cleansing solution steam and supply the cleansing solution steam. Unlike the first embodiment, the second embodiment includes the separate cleansing solution storing part 600.

In order to perform the function of generating the cleansing solution steam, the steam generating device 500 that heats or sprays the cleansing solution for steam generation is coupled to the cleansing solution storing part 600, and the steam generating device 500 is configured to be operated. When the steam generating device 500 generates the cleansing solution steam by a heating method, the steam generating device 500 should be configured to transfer heat generated by the steam generating device 500 to the stored cleansing solution. For example, the buffer storing part 400 may consist of a material with high thermal conductivity. When the steam generating device 500 generates the cleansing solution steam by a spray method, a spray generating structure such as a ultrasonic vibrator may be configured to be exposed to the inside of the cleansing solution storing part 600.

In order to supply the cleansing solution steam into the ink storing device and the like, the cleansing solution storing part 600 may be connected to the ink storing device and the like, and when the cleansing solution storing part 600 is connected to the buffer storing part 400 via a cleansing solution supply tube 610, since the buffer storing part 400 is connected to the ink storing device 200 via the additional supply tube 410 for ink replenishing, the cleansing solution steam can be supplied therethrough. Furthermore, for the function of supplying the cleansing solution steam into the ink storing device, power transferring the cleansing solution steam is required, and as positive pressure is applied, the cleansing solution steam that is generated inside the buffer storing part 400 may be pushed and supplied into the ink storing device and the like. To this end, in the embodiment, a third pressure control tube 330 of the gas pressure control system 300 is connected to the cleansing solution storing part 600. The cleansing solution steam that is generated in the cleansing solution storing part 600 may be supplied to the ink storing device 200 and the like via the buffer storing part 400, by using the positive pressure that is generated in the gas pressure control system 300.

In the embodiment shown in the drawing, when the buffer storing part 400 and the cleansing solution storing part 600 are provided separately, the time to refill the cleansing solution after the buffer storing part 400 is empty may be reduced. Furthermore, there is the effect of configuring the system in a method for adding the configuration for the steam cleaning to the configuration to which the conventional buffer storing part 400 is applied.

The steam generating device 500 is a device that heats or sprays the cleansing solution to generate the cleansing solution steam. The steam generating device 500 is provided at the cleansing solution storing part 600, and a heating plate for heating, the ultrasonic vibrator for spraying, or the like may be exposed to the inside of the cleansing solution storing part 600. The embodiment corresponds to the case in which the cleansing solution steam is generated by the heating method, and in order to prevent excessive heat from being generated, a temperature sensor 510 may be provided together with the cleansing solution storing part 600.

According to the second embodiment shown in FIG. 2, in the ink supply system for an ink-jet head with a steam cleaning function, a process of performing the steam cleaning will be described as follows.

In the embodiment, even before the buffer storing part 400 is completely emptied, the steam cleaning may be prepared such that the cleansing solution is supplied to the cleansing solution storing part 600. The cleansing solution is not particularly limited and a variety of solutions that may clean the ink storing device, the ink-jet head, and the like of the ink-jet printer may be applied. For example, simple water may be used, and a cleansing solution to which a cleaning component is added may be used.

While ink is removed from all of the buffer storing part 400, the ink storing device 200, and the ink-jet head 100, the cleansing solution steam is generated by using the cleansing solution supplied to the cleansing solution storing part 600. At this point, the cleansing solution steam may be supplied to the buffer storing part 400 together with generation of the cleansing solution steam, but it is preferable that the cleansing solution steam is generated when a large amount of the cleansing solution steam is supplied at once and the cleansing solution supply tube 610 is closed for performing the cleaning. Furthermore, in order to prevent the cleansing solution steam from flowing into the gas pressure control system 300, it is preferable that the cleansing solution steam is generated with the third pressure control tube 330 also closed.

After sufficient the cleansing solution steam is generated from the cleansing solution storing part 600, the gas pressure control system 300 applies positive pressure via the third pressure control tube 330 and opens the cleansing solution supply tube 610, so that the cleansing solution steam is supplied to the buffer storing part 400 via the cleansing solution supply tube 610.

The cleansing solution steam is supplied to the buffer storing part 400 via the cleansing solution supply tube 610 and then is supplied to the ink storing device 200 via the additional supply tube 410 via. The cleansing solution steam is supplied to the ink-jet head 100 via the supply flow path 110 and/or the recovery flow path 120, and moreover is supplied to the circulation flow path 130. At this point, in order to secure sufficient cleaning time for the ink storing device 200 and the circulation flow path 130, the supply flow path 110 and the recovery flow path 120 may be blocked for predetermined time so as to prevent the cleansing solution steam from moving and being ejected via the ink-jet head 100. Likewise, while the cleansing solution steam moves, the ink storing device 200 and the ink-jet head 100 and the supply flow path 110, the recovery flow path 120, and the circulation flow path 130 that are connected to the ink storing device 200 and the ink-jet head 100 are steam-cleaned.

After then, evaporation of the cleansing solution is stopped, and the cleansing solution is supplied in high pressure so that secondary cleaning can be performed. After the cleaning process using the cleansing solution steam and the cleansing solution is completed, dry air is injected from the gas pressure control system 300 thereby drying the inside.

The ink-jet printer having the ink supply system for an ink-jet head with a steam cleaning function, which has the above-described structure, generates the cleansing solution steam to clean the ink storing device and the ink-jet head, thereby making the ink storing device and the ink-jet head into a state in which concentrated, deposited, or adhered ink and particles can be easily removed. After then, as the ink storing device and the ink-jet head can be cleaned thoroughly by performing cleaning with the high-pressure cleansing solution, when ink is changed, a problem of contamination of new ink does not occur, in addition, when the same ink is used, as a problem as cleaning is performed during using printing, a problem generated due to residue ink and the like can be prevented.

Figure 3:
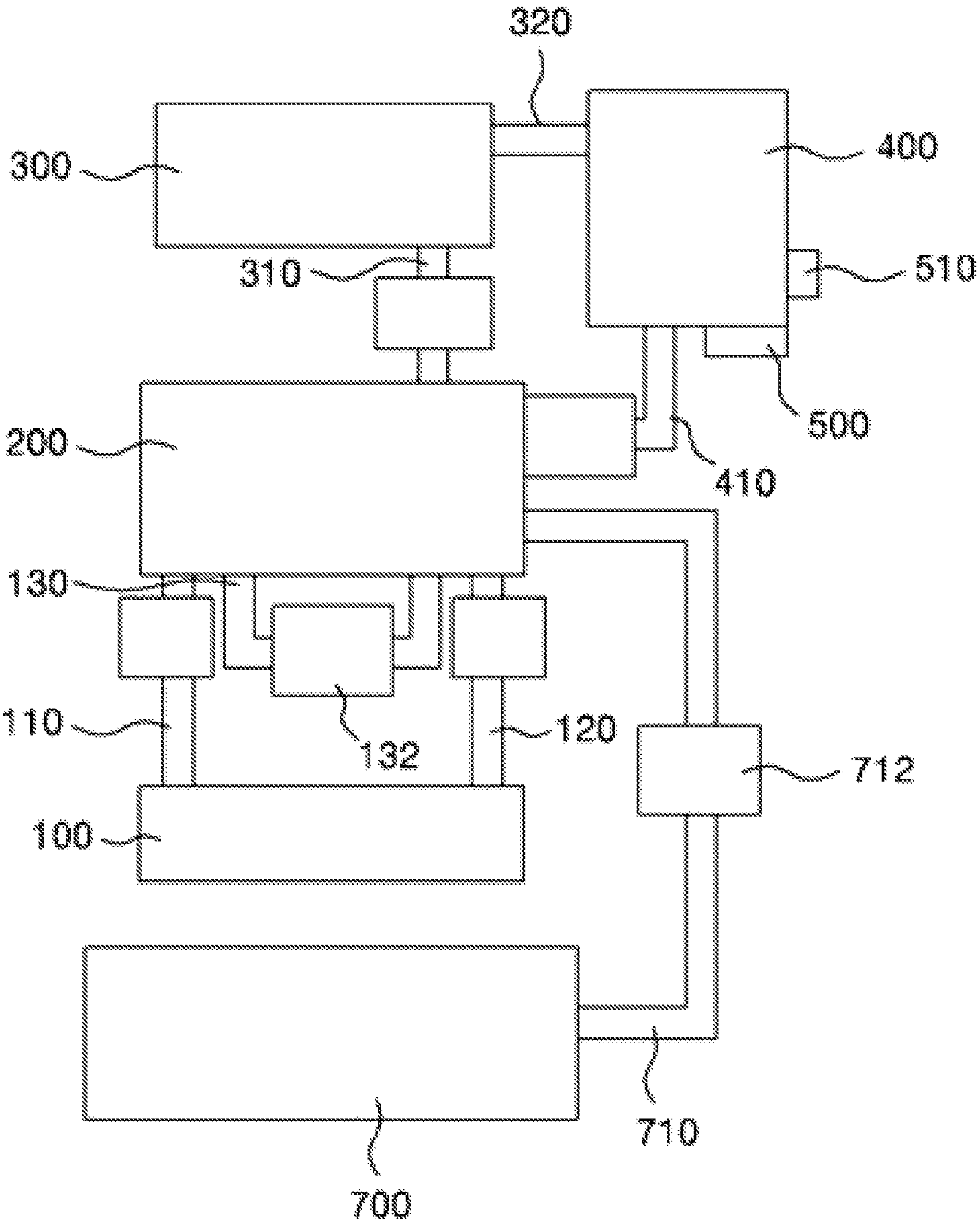
FIG. 3 is a mimetic diagram showing configuration of an ink supply system for an ink-jet head with a steam cleaning function according to a third embodiment.

FIG. 3 is a mimetic diagram showing configuration of an ink supply system for an ink-jet head with a steam cleaning function according to a third embodiment.

According to the third embodiment of the present disclosure, the ink supply system for an ink-jet head with a steam cleaning function includes: the ink-jet head 100, the ink storing device 200, the gas pressure control system 300, the buffer storing part 400, the steam generating device 500, and an ink recovery part 700.

The ink-jet head 100 is a part having a nozzle ejecting ink. The ink-jet printer shown in the drawing is configured for industrial use, so that the ink-jet head 100 and the ink storing device 200 are provided to be separated from each other. The detailed configuration of the ink-jet head 100 may adopt all technical configuration of the ink-jet head used conventionally without departing from a range that does not harm the characteristics of the present disclosure. Specifically, in order to prevent the nozzle of the ink-jet head 100 from being blocked by fine bubbles, the present disclosure may include the configuration that is for ejecting the micro bubbles outside the ink-jet head 100.

The ink storing device 200 is a part that stores the ink to supply the ink to the ink-jet head 100. First ends of a supply flow path 110, which is for supplying the ink to the ink-jet head 100, and a recovery flow path 120, along which at least a part of the ink supplied to the ink-jet head 100 is circulated and returns, are connected to the ink storing device 200, and a first end of a pressure control tube 310 for maintaining a meniscus state is connected thereto.

Second ends of the supply flow path 110 and the recovery flow path 120 of which the first ends are connected to the ink storing device 200 are connected to the ink-jet head 100. The ink-jet head 100 is supplied with ink via the supply flow path 110 and performs ink-jet printing via the nozzle. As at least a part of the supplied ink is recovered to the ink storing device 200 via the recovery flow path 120, the ink is circulated. At this point, a circulation pump may be provided to achieve the circulation of ink via the supply flow path 110 and the recovery flow path 120. The circulation pump is mainly provided at the recovery flow path 120 and generally, serves to recover at least a part of the ink, which is supplied to the ink-jet head 100, to the ink storing device 200. However, a location of the circulation pump is not limited to the recovery flow path 120, and may be formed on the supply flow path. As the circulation pump constantly circulates ink between the ink storing device 200 and the ink-jet head 100, the dispersibility of the ink can be maintained, and at this point, it is preferable to prevent an operation of the circulation pump from affecting the meniscus state.

In addition to maintaining of constant flow of the ink by using the supply flow path 110 and the recovery flow path 120 that are connected to the ink-jet head 100, a circulation flow path 130 may be added to drain ink to the outside from the ink storing device 200 and return back the ink into the ink storing device 200. In the embodiment shown in the drawing, the circulation flow path 130 on which a pump 132 is provided is connected to the ink storing device 200, so that ink stored in the ink storing device 200 is prevented from being stored in a stationary state, and the ink maintains the flowability while constantly moving along the circulation flow path 130, thereby maintaining the dispersibility of the ink. Even in a process of forming a flow of ink via the circulation flow path 130, it is controlled to also maintain the meniscus state of the ink.

A second end of the pressure control tube 310 is connected to the gas pressure control system 300, and the gas pressure control system 300 controls the pressure in the ink storing device 200, thereby applying negative pressure into the ink storing device 200 in order for the ink in the ink-jet head 100 to be maintained in the meniscus state. Eventually, except for specific cases, since the embodiment is configured to constantly suction air via the pressure control tube 310, while a bubble formed at the ink storing device 200 bursts, a droplet of the ink spread upward may move via the pressure control tube 310. The droplet of the ink flowing into the pressure control tube 310 causes failure in the gas pressure control system 300, so that the configuration that prevents ink or a droplet of ink from being introduced into the pressure control tube 310 may be applied.

The buffer storing part 400 is connected to the ink storing device 200 via an additional supply tube 410, thereby being applied to inject ink into the ink storing device without harming the meniscus state. When ink is added into the buffer storing part 400, additional ink can be injected without considering the meniscus state. There is a loss when printing stops in a process of adding ink consumed by performing printing, but when ink is added via the buffer storing part 400, ink can be constantly added without stopping a printing process. For this buffer storing part 400, techniques used in a general ink-jet printer may be applied almost without limitation, but in the embodiment, it is characterized in that the buffer storing part 400 may also be used as a space for forming and supplying the cleansing solution steam.

The present disclosure is characterized in that the cleansing solution steam is used to clean the ink-jet head, the ink storing device, and the like, and in the embodiment, the buffer storing part 400 serves as the space that may be provided to store the cleansing solution for forming cleaning steam and to change the stored cleansing solution into the steam and supply the steam into the ink storing device and the like.

The function of storing the cleansing solution may be performed by ejecting the cleansing solution into the buffer storing part 400 that has been empty as all the ink stored in the buffer storing part 400 is inserted into the ink storing device 200. Accordingly, for storage of the cleansing solution, there is no need to change the configuration of the conventional buffer storing part 400.

In order to perform the function as the space in which cleansing solution steam is generated, the steam generating device 500 that heats or sprays the cleansing solution for generating steam may be coupled to the buffer storing part 400?, and the steam generating device 500 may be configured to be operated. When the steam generating device 500 generates the cleansing solution steam by a heating method, the steam generating device 500 should be configured to transfer heat generated by the steam generating device 500 to the stored cleansing solution. For example, the buffer storing part 400 may consist of a material with high thermal conductivity. When the steam generating device 500 generates the cleansing solution steam by a spray method, a spray generating structure such as a ultrasonic vibrator may be configured to be exposed to the inside of the buffer storing part 400.

For the function of supplying the cleansing solution steam into the ink storing device and the like, the steam generating device 500 should be connected to the ink storing device, and since the additional supply tube 410 for replenishing ink is connected to the ink storing device 200, the additional supply tube 41 may be used as a connection tube for supplying the cleansing solution steam. Furthermore, for the function of supplying the cleansing solution steam into the ink storing device, power transferring the cleansing solution steam is required, and as positive pressure is applied, the cleansing solution steam that is generated inside the buffer storing part 400 may be pushed and supplied into the ink storing device and the like. To this end, in the embodiment, a second pressure control tube 320 of the gas pressure control system 300 is connected to the buffer storing part 400. The cleansing solution steam that is generated in the buffer storing part 400 may be supplied to the ink storing device 200 and the like by using the positive pressure that is generated in the gas pressure control system 300.

Likewise, the buffer storing part 400 may be used as the cleansing solution storing part that is the space for generating the cleansing solution steam, but the present disclosure is not limited thereto. The cleansing solution storing part may be formed separately from the buffer storing part 400, or only the cleansing solution storing part may be additionally provided with the buffer storing part 400 not applied. However, as shown in the embodiment, as the configuration of the buffer storing part 400 is applied, and it is configured to generate the cleansing solution steam, when the buffer storing part 300 is configured to serve the function of the cleansing solution storing part at the same time, the buffer storing part 400 performs both of the function of the buffer storing part that facilitates the process of additionally ejecting ink and the function of generating the cleansing solution steam, so that the space efficiency of the device can be improved.

The steam generating device 500 is a device that heats or sprays the cleansing solution to generate the cleansing solution steam. The steam generating device 500 is provided at the buffer storing part 400 in which the cleansing solution is stored, and a heating plate for heating, the ultrasonic vibrator for spraying, or the like may be exposed to the inside of the buffer storing part 400. The embodiment corresponds to the case in which the cleansing solution steam is generated by the heating method, and in order to prevent excessive heat from being generated, a temperature sensor 510 may be provided together with the buffer storing part 400.

The ink recovery part 700 is located at a lower portion of the ink-jet head 100 and is connected to the ink storing device 200 via a reuse flow path 710 so as to collect ink ejected through the ink-jet head 100 and then return the ink to the ink storing device 200 so that the ink is reused.

When ink is reused after device cleaning without changing the ink, the ink recovery part 700 is configured to allow ink to be completely empty through the ink-jet head 100 without waiting discharge of ink in the ink storing device 200, and to recover collected ink to the cleaned ink storing device 200.

According to the third embodiment shown in FIG. 2, in the ink supply system for an ink-jet head with a steam cleaning function, a process of performing the steam cleaning will be described as follows.

When cleaning is performed without changing ink, ink stored in the buffer storing part 400 and the ink storing device 200 are ejected through the ink-jet head 100, and the ejected ink is collected into the ink recovery part 700.

The buffer storing part 400 is almost empty, the cleansing solution is supplied into the buffer storing part 400. The cleansing solution is not particularly limited and a variety of solutions that may clean the ink storing device, the ink-jet head, and the like of the ink-jet printer may be applied. For example, simple water may be used, and a cleansing solution to which a cleaning component is added may be used.

While the cleansing solution is supplied to the buffer storing part 400 and ink is removed from both of the ink storing device 200 and the ink-jet head 100, the cleansing solution steam is generated by using the cleansing solution supplied to the buffer storing part 400. At this point, the cleansing solution steam may be supplied to the ink storing device 200 together with generation of the cleansing solution steam, but it is preferable that the cleansing solution steam is generated when a large amount of the cleansing solution steam is supplied at once and the additional supply tube 410 is closed for performing the cleaning. Furthermore, in order to prevent the cleansing solution steam from flowing into the gas pressure control system 300, it is preferable that the cleansing solution steam is generated with the second pressure control tube 320 also closed.

After sufficient the cleansing solution steam is generated from the buffer storing part 400, the gas pressure control system 300 applies positive pressure via the second pressure control tube 320 and opens the additional supply tube 410, so that the cleansing solution steam is supplied to the ink storing device 200 via the additional supply tube 410.

The cleansing solution steam is supplied to the ink storing device 200 via the additional supply tube 410 and then is supplied to the ink-jet head 100 via the supply flow path 110 and/or the recovery flow path 120, and moreover is supplied to the circulation flow path 130. At this point, in order to secure sufficient cleaning time for the ink storing device 200 and the circulation flow path 130, the supply flow path 110 and the recovery flow path 120 may be blocked for predetermined time so as to prevent the cleansing solution steam from moving and being ejected via the ink-jet head 100. Likewise, while the cleansing solution steam moves, the ink storing device 200 and the ink-jet head 100 and the supply flow path 110, the recovery flow path 120, and the circulation flow path 130 that are connected to the ink storing device 200 and the ink-jet head 100 are steam-cleaned.

After then, evaporation of the cleansing solution is stopped, and the cleansing solution is supplied in high pressure so that secondary cleaning can be performed. After the cleaning process using the cleansing solution steam and the cleansing solution is completed, dry air is injected from the gas pressure control system 300 thereby drying the inside.

After the ink storing device 200 is cleaned and dried, the collected ink in the ink recovery part 700 is returned to the ink storing device 200 via the reuse flow path 710, so that the ink-jet printing process using the same ink can be constantly performed.

The ink-jet printer having the ink supply system for an ink-jet head with a steam cleaning function, which has the above-described structure, generates the cleansing solution steam to clean the ink storing device and the ink-jet head, thereby making the ink storing device and the ink-jet head into a state in which concentrated, deposited or adhered ink and particles can be easily removed. After then, as the ink storing device and the ink-jet head can be cleaned thoroughly by performing cleaning with the high-pressure cleansing solution, when ink is changed, a problem of contamination of new ink does not occur, in addition, when the same ink is used, as a problem as cleaning is performed during using printing, a problem generated due to residue ink and the like can be prevented. Specifically, there is the effect of further facilitating the process of cleaning while the same ink is used, with the ink recovery part.

Figure 4:
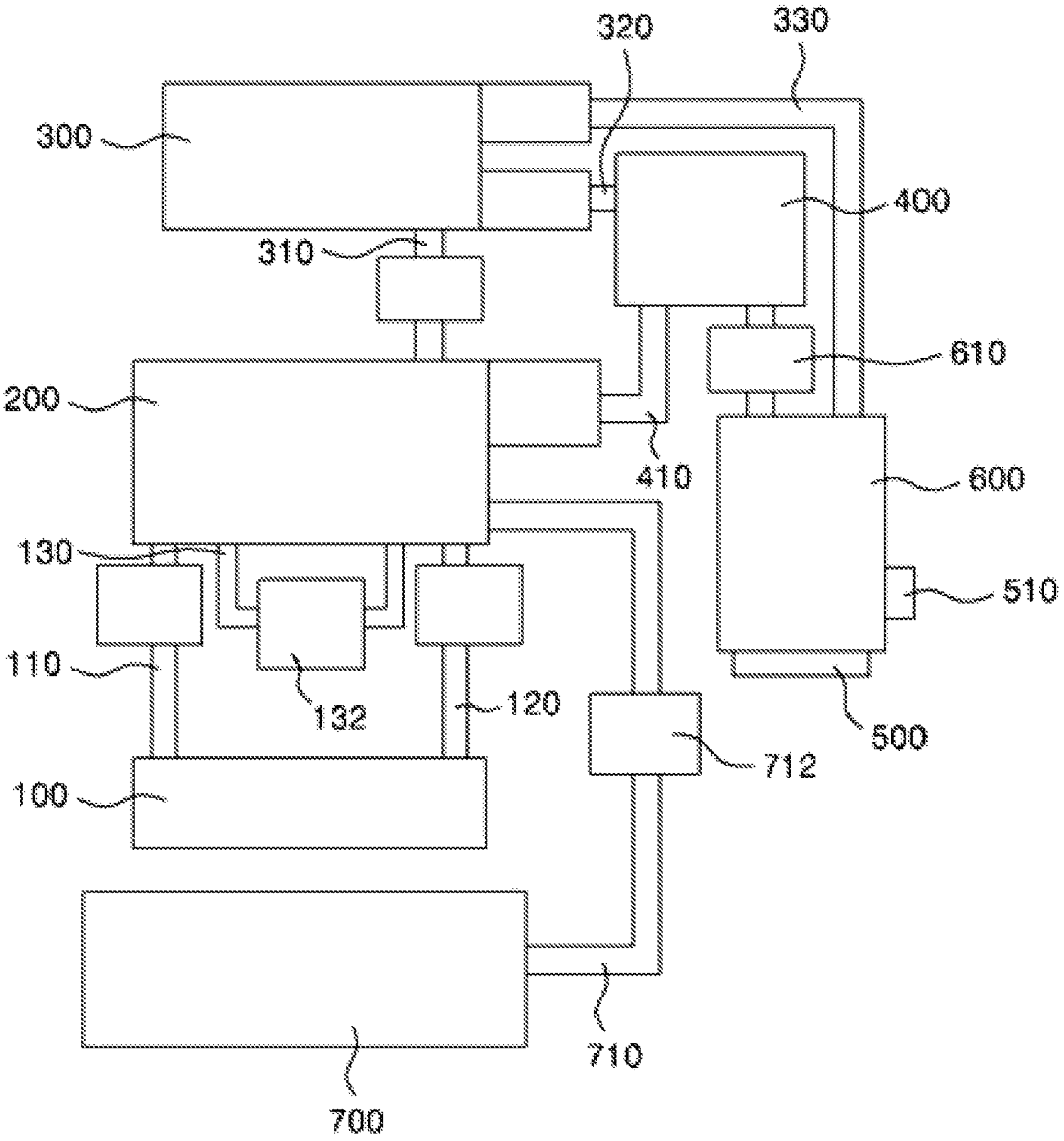
FIG. 4 is a mimetic diagram showing configuration of an ink supply system for an ink-jet head with a steam cleaning function according to a fourth embodiment.

FIG. 4 is a mimetic diagram showing configuration of an ink supply system for an ink-jet head with a steam cleaning function according to a fourth embodiment.

According to the fourth embodiment of the present disclosure, the ink supply system for an ink-jet head with a steam cleaning function includes: the ink-jet head 100, the ink storing device 200, the gas pressure control system 300, the buffer storing part 400, the steam generating device 500, the cleansing solution storing part 600, and the ink recovery part 700.

The ink-jet head 100 is a part having a nozzle ejecting ink. The ink-jet printer shown in the drawing is configured for industrial use, so that the ink-jet head 100 and the ink storing device 200 are provided to be separated from each other. The detailed configuration of the ink-jet head 100 may adopt all technical configuration of the ink-jet head used conventionally without departing from a range that does not harm the characteristics of the present disclosure. Specifically, in order to prevent the nozzle of the ink-jet head 100 from being blocked by fine bubbles, the present disclosure may include the configuration that is for ejecting the micro bubbles outside the ink-jet head 100.

The ink storing device 200 is a part that stores the ink to supply the ink to the ink-jet head 100. First ends of a supply flow path 110, which is for supplying the ink to the ink-jet head 100, and a recovery flow path 120, along which at least a part of the ink supplied to the ink-jet head 100 is circulated and returns, are connected to the ink storing device 200, and a first end of a pressure control tube 310 for maintaining the meniscus state is connected thereto.

Second ends of the supply flow path 110 and the recovery flow path 120 of which the first ends are connected to the ink storing device 200 are connected to the ink-jet head 100. The ink-jet head 100 is supplied with ink via the supply flow path 110 and performs ink-jet printing via the nozzle. As at least a part of the supplied ink is recovered to the ink storing device 200 via the recovery flow path 120, the ink is circulated. At this point, a circulation pump may be provided to achieve the circulation of ink via the supply flow path 110 and the recovery flow path 120. The circulation pump is mainly provided at the recovery flow path 120 and generally, serves to recover at least a part of the ink, which is supplied to the ink-jet head 100, to the ink storing device 200. However, a location of the circulation pump is not limited to the recovery flow path 120, and may be formed on the supply flow path. As the circulation pump constantly circulates ink between the ink storing device 200 and the ink-jet head 100, the dispersibility of the ink can be maintained, and at this point, it is preferable to prevent an operation of the circulation pump from affecting the meniscus state.

In addition to maintaining of constant flow of the ink by using the supply flow path 110 and the recovery flow path 120 that are connected to the ink-jet head 100, a circulation flow path 130 may be added to drain ink to the outside from the ink storing device 200 and return back the ink into the ink storing device 200. In the embodiment shown in the drawing, the circulation flow path 130 on which a pump 132 is provided is connected to the ink storing device 200, so that ink stored in the ink storing device 200 is prevented from being stored in a stationary state, and the ink maintains the flowability while constantly moving along the circulation flow path 130, thereby maintaining the dispersibility of the ink. Even in a process of forming a flow of ink via the circulation flow path 130, it is controlled to also maintain the meniscus state of the ink.

A second end of the pressure control tube 310 is connected to the gas pressure control system 300, and the gas pressure control system 300 controls the pressure in the ink storing device 200, thereby applying negative pressure into the ink storing device 200 in order for the ink in the ink-jet head 100 to be maintained in the meniscus state. Eventually, except for specific cases, since the embodiment is configured to constantly suction air via the pressure control tube 310, while a bubble famed at the ink storing device 200 bursts, a droplet of the ink spread upward may move via the pressure control tube 310. The droplet of the ink flowing into the pressure control tube 310 causes failure in the gas pressure control system 300, so that the configuration that prevents ink or a droplet of ink from being introduced into the pressure control tube 310 may be applied.

The buffer storing part 400 is connected to the ink storing device 200 via an additional supply tube 410, thereby being applied to inject ink into the ink storing device without harming the meniscus state. When ink is added into the buffer storing part 400, additional ink can be injected without considering the meniscus state. There is a loss when printing stops in a process of adding ink consumed by performing printing, but when ink is added via the buffer storing part 400, ink can be constantly added without stopping a printing process. For this buffer storing part 400, techniques used in the general ink-jet printer may be applied almost without limitation.

The cleansing solution storing part 600 is connected to the buffer storing part 400 and is configured to store the cleansing solution and generate the cleansing solution steam and supply the cleansing solution steam. Unlike the first embodiment, the second embodiment includes the separate cleansing solution storing part 600.

In order to perform the function of generating the cleansing solution steam, the steam generating device 500 that heats or sprays the cleansing solution for steam generation is coupled to the cleansing solution storing part 600, and the steam generating device 500 is configured to be operated. When the steam generating device 500 generates the cleansing solution steam by a heating method, the steam generating device 500 should be configured to transfer heat generated by the steam generating device 500 to the stored cleansing solution. For example, the buffer storing part 400 may consist of a material with high thermal conductivity. When the steam generating device 500 generates the cleansing solution steam by a spray method, a spray generating structure such as a ultrasonic vibrator may be configured to be exposed to the inside of the cleansing solution storing part 600.

In order to supply the cleansing solution steam into the ink storing device and the like, the cleansing solution storing part 600 may be connected to the ink storing device and the like, and when the cleansing solution storing part 600 is connected to the buffer storing part 400 via a cleansing solution supply tube 610, since the buffer storing part 400 is connected to the ink storing device 200 via the additional supply tube 410 for ink replenishing, the cleansing solution steam can be supplied therethrough. Furthermore, for the function of supplying the cleansing solution steam into the ink storing device, power transferring the cleansing solution steam is required, and as positive pressure is applied, the cleansing solution steam that is generated inside the buffer storing part 400 may be pushed and supplied into the ink storing device and the like. To this end, in the embodiment, a third pressure control tube 330 of the gas pressure control system 300 is connected to the cleansing solution storing part 600. The cleansing solution steam that is generated in the cleansing solution storing part 600 may be supplied to the ink storing device 200 and the like via the buffer storing part 400, by using the positive pressure that is generated in the gas pressure control system 300.

In the embodiment shown in the drawing, when the buffer storing part 400 and the cleansing solution storing part 600 are provided separately, the time to refill the cleansing solution after the buffer storing part 400 is empty may be reduced. Furthermore, there is the effect of configuring the system in a method for adding the configuration for the steam cleaning to the configuration to which the conventional buffer storing part 400 is applied.

The steam generating device 500 is a device that heats or sprays the cleansing solution to generate the cleansing solution steam. The steam generating device 500 is provided at the cleansing solution storing part 600, and a heating plate for heating, the ultrasonic vibrator for spraying, or the like may be exposed to the inside of the cleansing solution storing part 600. The embodiment corresponds to the case in which the cleansing solution steam is generated by the heating method, and in order to prevent excessive heat from being generated, a temperature sensor 510 may be provided together with the cleansing solution storing part 600.

The ink recovery part 700 is located at a lower portion of the ink-jet head 100 and is connected to the ink storing device 200 via a reuse flow path 710 so as to collect ink ejected through the ink-jet head 100 and then return the ink to the ink storing device 200 so that the ink is reused.

When ink is reused after device cleaning without changing the ink, the ink recovery part 700 is configured to allow ink to be completely empty through the ink-jet head 100 without waiting discharge of ink in the ink storing device 200, and to recover collected ink to the cleaned ink storing device 200.

According to the fourth embodiment shown in FIG. 4, in the ink supply system for an ink-jet head with a steam cleaning function, a process of performing the steam cleaning will be described as follows.

In the embodiment, even before the buffer storing part 400 is completely emptied, the steam cleaning may be prepared such that the cleansing solution is supplied to the cleansing solution storing part 600. The cleansing solution is not particularly limited and a variety of solutions that may clean the ink storing device, the ink-jet head, and the like of the ink-jet printer may be applied. For example, simple water may be used, and a cleansing solution to which a cleaning component is added may be used.

When cleaning is performed without changing ink, ink stored in the buffer storing part 400 and the ink storing device 200 are ejected through the ink-jet head 100, and the ejected ink is collected into the ink recovery part 700. While ink is removed from all of the buffer storing part 400, the ink storing device 200, and the ink-jet head 100, the cleansing solution steam is generated by using the cleansing solution supplied to the cleansing solution storing part 600. At this point, the cleansing solution steam may be supplied to the buffer storing part 400 together with generation of the cleansing solution steam, but it is preferable that the cleansing solution steam is generated when a large amount of the cleansing solution steam is supplied at once and the cleansing solution supply tube 610 is closed for performing the cleaning. Furthermore, in order to prevent the cleansing solution steam from flowing into the gas pressure control system 300, it is preferable that the cleansing solution steam is generated with the third pressure control tube 330 also closed.

After sufficient the cleansing solution steam is generated from the cleansing solution storing part 600, the gas pressure control system 300 applies positive pressure via the third pressure control tube 330 and opens the cleansing solution supply tube 610, so that the cleansing solution steam is supplied to the buffer storing part 400 via the cleansing solution supply tube 610.

The cleansing solution steam is supplied to the buffer storing part 400 via the cleansing solution supply tube 610 and then is supplied to the ink storing device 200 via the additional supply tube 410 via. The cleansing solution steam is supplied to the ink-jet head 100 via the supply flow path 110 and/or the recovery flow path 120, and moreover is supplied to the circulation flow path 130. At this point, in order to secure sufficient cleaning time for the ink storing device 200 and the circulation flow path 130, the supply flow path 110 and the recovery flow path 120 may be blocked for predetermined time so as to prevent the cleansing solution steam from moving and being ejected via the ink-jet head 100. Likewise, while the cleansing solution steam moves, the ink storing device 200 and the ink-jet head 100 and the supply flow path 110, the recovery flow path 120, and the circulation flow path 130 that are connected to the ink storing device 200 and the ink-jet head 100 are steam-cleaned.

After then, evaporation of the cleansing solution is stopped, and the cleansing solution is supplied in high pressure so that secondary cleaning can be performed. After the cleaning process using the cleansing solution steam and the cleansing solution is completed, dry air is injected from the gas pressure control system 300 thereby drying the inside.

After the ink storing device 200 is cleaned and dried, the collected ink in the ink recovery part 700 is returned to the ink storing device 200 via the reuse flow path 710, so that the ink-jet printing process using the same ink can be constantly performed.

The ink-jet printer having the ink supply system for an ink-jet head with a steam cleaning function, which has the above-described structure, generates the cleansing solution steam to clean the ink storing device and the ink-jet head, thereby making the ink storing device and the ink-jet head into a state in which concentrated, deposited or adhered ink and particles can be easily removed. After then, as the ink storing device and the ink-jet head can be cleaned thoroughly by performing cleaning with the high-pressure cleansing solution, when ink is changed, a problem of contamination of new ink does not occur, in addition, when the same ink is used, as a problem as cleaning is performed during using printing, a problem generated due to residue ink and the like can be prevented. Specifically, there is the effect of further facilitating the process of cleaning while the same ink is used, with the ink recovery part.

Hereinabove, the present disclosure has been described with reference to the preferred embodiments. Although the preferred embodiments of the present disclosure have been described for illustrative purposes, those skilled in the art will appreciate that various modifications, additions and substitutions are possible, without departing from the scope and spirit of the present disclosure as disclosed in the accompanying claims. Therefore, the protection scope of the present disclosure should be interpreted by the matters described in the accompanying claims, not by a specific embodiment, and all technical ideas within the equivalent scope should be construed as being included in the scope of the present disclosure.

What is claimed is:

1. An ink supply system for an ink-jet head with a steam cleaning function, the ink supply system comprising:

an ink-jet head comprising a nozzle ejecting ink;

an ink storing device in which ink supplied to the ink-jet head is stored;

a gas pressure control system applying negative pressure or positive pressure to the ink storing device;

a cleansing solution storing part configured to store a cleansing solution; and a steam generating device configured to change at least a part of the cleansing solution that is stored in the cleansing solution storing part into steam, wherein the cleansing solution stored in the cleansing solution storing part or the cleansing solution steam is inserted into the ink storing device to clean the ink storing device and the ink-jet head, and wherein the cleansing solution storing part is connected to the gas pressure control system, thereby enabling the cleansing solution or the cleansing solution steam to be transferred to the ink storing device by the positive pressure generated from the gas pressure control system.

2. The ink supply system of claim 1, wherein the cleansing solution storing part is a buffer storing part that is provided for supplying ink to the ink storing device.

3. The ink supply system of claim 1, further comprising:

a buffer storing part for supplying ink to the ink storing device, wherein the cleansing solution storing part is connected to the buffer storing part.

4. The ink supply system of claim 1, further comprising:

an ink recovery part located at a lower portion of the ink-jet head and configured to collect the ink ejected from the ink-jet head, and a reuse flow path configured to return the ink collected in the ink recovery part to the ink storing device.

5. An ink-jet printer having an ink supply system for an ink-jet head with a steam cleaning function, the ink-jet printer comprising:

an ink-jet head comprising a nozzle ejecting ink;

an ink storing device in which ink supplied to the ink-jet head is stored;

a gas pressure control system applying negative pressure or positive pressure to the ink storing device;

a cleansing solution storing part configured to store a cleansing solution; and a steam generating device configured to change at least a part of the cleansing solution that is stored in the cleansing solution storing part into steam, wherein the cleansing solution stored in the cleansing solution storing part or the cleansing solution steam is inserted into the ink storing device to clean the ink storing device and the ink-jet head, and wherein the cleansing solution storing part is connected to the gas pressure control system, thereby enabling the cleansing solution or the cleansing solution steam to be transferred to the ink storing device by the positive pressure generated from the gas pressure control system.

6. The ink-jet printer of claim 5, wherein the cleansing solution storing part is a buffer storing part that is provided for supplying ink to the ink storing device.

7. The ink-jet printer of claim 5, further comprising:

a buffer storing part for supplying ink to the ink storing device, wherein the cleansing solution storing part is connected to the buffer storing part.

8. The ink-jet printer of claim 5, further comprising:

an ink recovery part located at a lower portion of the ink-jet head and configured to collect the ink ejected from the ink-jet head, and a reuse flow path configured to return the ink collected in the ink recovery part to the ink storing device.

* * * * *